United States Patent
Piellard

(10) Patent No.: US 9,314,967 B2
(45) Date of Patent: Apr. 19, 2016

(54) CLAMPING DEVICE FOR CLAMPING A WORKPIECE, AND INSTALLATION COMPRISING SUCH A CLAMPING DEVICE

(71) Applicant: Statice, Besancon (FR)

(72) Inventor: Michel Piellard, Chemaudin (FR)

(73) Assignee: STATICE, Besancon (FR)

(*) Notice: Subject to any disclaimer, the term of this patent is extended or adjusted under 35 U.S.C. 154(b) by 177 days.

(21) Appl. No.: 14/218,219

(22) Filed: Mar. 18, 2014

(65) Prior Publication Data

US 2015/0265800 A1 Sep. 24, 2015

(51) Int. Cl.
*B29C 65/00* (2006.01)
*B25B 9/02* (2006.01)
*A61M 39/00* (2006.01)

(52) U.S. Cl.
CPC . *B29C 66/50* (2013.01); *B25B 9/02* (2013.01); *Y10T 29/53974* (2015.01)

(58) Field of Classification Search
CPC .............. B25B 1/00; B25B 1/02; B25B 1/04; B25B 1/20; B25B 1/2452; B25B 1/2478; B25B 5/02; B25B 5/064; B25B 5/147; B25B 5/04; B25B 9/02; B25B 11/02; B29C 66/50; Y10T 29/53974
USPC .............................................. 29/281.1, 281.4
See application file for complete search history.

(56) References Cited

U.S. PATENT DOCUMENTS

| 3,711,919 | A | * | 1/1973 | Cousin | A01K 87/04 29/227 |
| 3,970,296 | A | * | 7/1976 | Rameson | B25B 5/064 269/134 |
| 5,133,113 | A | * | 7/1992 | Mueller | B01L 9/50 24/504 |
| 5,546,491 | A | * | 8/1996 | Loch | G02B 6/2551 385/98 |
| 5,613,655 | A | * | 3/1997 | Marion | F16L 3/2235 24/339 |
| 7,001,084 | B2 | * | 2/2006 | Carpenter | G02B 6/3801 385/95 |
| 7,926,797 | B2 | * | 4/2011 | Sorenson | G02B 6/4475 269/138 |
| 2011/0026896 | A1 | * | 2/2011 | Winberg | G02B 6/245 385/137 |
| 2015/0123330 | A1 | * | 5/2015 | Zhao | G02B 6/2555 269/8 |

* cited by examiner

*Primary Examiner* — Joseph J Hail
*Assistant Examiner* — Jon Taylor
(74) *Attorney, Agent, or Firm* — Brinks Gilson & Lione; G. Peter Nichols

(57) ABSTRACT

A clamping device for clamping a workpiece having a constant section includes a base; a head; jaws including a jaw fixed to the base and a jaw facing the other jaw and fixed to the head to clamp the workpiece; a guide to link the head to the base and to allow the displacement of the head in an action direction between a clamping position and an opening position. The guide includes at least two plates parallel one with the other with each plate being linked at a first end to a heel of the base and to the head at a second end opposed to the first end, the first ends and second ends being flexible to allow the plates to pivot in relation to the heel and the head, respectively; the clamping device being in one block of monolithic material such as metal.

15 Claims, 5 Drawing Sheets

CLAMPING DEVICE FOR CLAMPING A WORKPIECE, AND INSTALLATION COMPRISING SUCH A CLAMPING DEVICE

BACKGROUND

The invention is related to a clamping device for clamping a workpiece, in particular but not limited to a workpiece for constituting a catheter. The invention is also related to an installation comprising at least one of such a clamping device.

Catheters are constituted with tubes of little diameter. A part of the tube should be stiff as the catheter has to be pushed in a vein of a patient, and a terminal part should be more flexible to be directed to a direction or a location for exerting an action. Thus it is known assemble two parts of the catheter, but having the same or different diameters, or in different materials. The materials are in general a thermoplastic resin. The two parts are issued from the assembling of two workpieces in abutment by welding or bonding. As it is important that there is no knifing or aggressive protrusion on the outer surface of the catheter, the workpieces are to be well aligned during the assembling.

For that, it is known to use a clamping device to hold one of the workpieces, the clamping device comprising a mandrel having a central hole and a housing surrounding the mandrel. The device comprises means for compressing the mandrel. A workpiece in form of a tube is introduced in the central hole in a manner that when the mandrel is compressed, the inner diameter of the central hole is reduced and tight the part. An installation for assembling two workpieces comprises two clamping devices having mandrel with the same axis to align the two workpieces.

Although this device allows a good alignment and assembling, the device has not good performances. The parts before the assembling must be introduced in the mandrel by a translation movement in axial direction, which can be long and tricky. Furthermore, the deformation of the mandrel induces slipping between the mandrel and the part, and thus wearing of the mandrel. Thus the mandrel has to be changed frequently.

SUMMARY

It is an object of the invention to provide a clamping device allowing a quick clamping of a part and avoiding wear of the device.

It is another object of the invention to provide an installation for assembling workpieces.

With these aims in mind, the object of the invention is a clamping device for clamping a workpiece having a constant section, comprising:

a base;

a head;

a couple of jaws comprising a lower jaw fixed to the base and an upper jaw facing the lower jaw and fixed to the head;

guiding means to link the head to the base, and allowing the displacement of the head in an action direction between a clamping position, wherein the jaws define a clamping space having a constant section between them to tight the workpiece, and an opening position wherein the jaws are opened, allowing the lateral insertion of the workpiece between the jaws;

the guiding means comprising at least two plates parallel one with the other, each plate being linked at a first end to a heel of the base, and to the head at a second end opposed to the first end, the first ends and second ends being flexible to allow the plates to pivot in relation to respectively the heel and the head;

the clamping device being in one block of monolithic material such as metal.

The guiding means allow that the head has a displacement keeping the same direction and near a translation, thus a circular translation. In fact, the heel, the head and the plates form a parallelogram which is deformable, keeping the head parallel to the heel and the plates parallel one with the other. As the clamping device comprises two jaws which can be distant in opening position, the workpiece can be inserted between the jaws, in a lateral movement which is simpler and speeder as the insertion in a hole. Furthermore, as the clamping device is in one block monolithic material, it is simpler to manufacture, in that there is no different pieces to assemble. Furthermore, the jaws being in metal, there is no need to change any part of the device, as the jaws are in metal, thus more wear resistant as elastomeric parts. The position of the workpiece is more precise as the jaws are stiff and the clamping movement does not induce any displacement of the workpiece. The profile of the clamping surfaces of the jaws can be adapted to the profile of the workpiece, so that the forces applied on the workpiece are well distributed and the pressure is low. The quality of the surface of the workpiece is preserved. The workpiece can be made of polymers, metal, glass or any fragile material. The clamping device is particularly adapted to clamp a piece in tubular form provided for manufacturing a catheter.

In an embodiment, the head has linking means to allow action means to acting the head between the clamping position and the opening position.

According to an improvement, the clamping device comprises balancing means to bias the head towards the opening position. The balancing means allow that the balance position of the guiding means is located between the clamping position and the opening position. Thus, the deformation of the flexible ends of plates is limited. If the balance position is at the middle of the extreme positions, the deformation is divided by two. According to the limit fatigue strain, this allows to reduce by two the length of the plates.

In an embodiment, balancing means comprise at least a pin fixed on the base in the action direction and a spring surrounding the pin and acting between the base and the head.

In an embodiment, the clamping device comprises a stop rod fixed on the base crossing the head through a hole, the stop rod having an abutment against which the head is stopped in the opening position. The stop rod can be a threaded rod of a screw and the abutment a head of this screw. Thus, the stiffness of the spring and the prestress against the abutment can be chosen independently from the opening position and according to conditions of operation of the device.

In particular, the first or second end of the plate can comprise a weakening being less thick than the plate. The weakening being less thick, it is more flexible than the plate and thus, the flexion is located at the weakening.

In particular, the first or second end of the plate can comprise an opening through the full thickness of the plate and a part of the width of the plate. Thus the ends are more flexible as the plate and thus, the flexion is located at the ends of the plates.

According to a particular characteristic, the base comprises a main surface to fix the device on an installation, the main surface being perpendicular to the action direction, and wherein the base comprises a groove opened on the main surface and centered on the clamping space. Thus, the clamping device can be quickly fixed on an installation with a reproducible place. Different clamping devices, for example with different forms or dimensions of clamping space, can be installed successively on the same installation, the clamping space being always centered on the same axis. The workpiece is thus always on the same axis on the installation.

The clamping device can comprise abutment means, the abutment means comprising a shoulder protruding from the lower jaw towards the upper jaw, and an abutment groove in the head, the shoulder being abutted in the abutment groove when the head is in the clamping position. The abutment means can avoid that the workpiece is crushed when clamped. The use of a shoulder and a groove allows deporting the surfaces in abutment. Furthermore, the shoulder helps stopping the workpiece when inserted in a radial direction according to the clamping space and guiding the workpiece towards its clamping position.

According to another characteristic, the base comprises a tongue at an end opposed to the heel, to clamp the base on an installation.

The invention concerns also an installation for working on a workpiece having a constant section, the installation comprising a structure, a tool device fixed on the structure, at least one clamping device for clamping the workpiece near the tool device, the clamping device comprising:
 a base fixed on the structure;
 a head;
 a couple of jaws comprising a lower jaw fixed to the base and an upper jaw facing the lower jaw and fixed to the head;
 guiding means to link the head to the base and allowing the displacement of the head in an action direction between a clamping position wherein the jaws define a clamping space having a constant section between them to tight the workpiece, and an opening position wherein the jaws are opened allowing the lateral insertion of the workpiece between the jaws;
 the guiding means comprising at least two plates parallel one with the other, each plate being linked at a first end to a heel of the base and to the head at a second end opposed to the first end, the first ends and second ends being flexible to allow the plates to pivot in relation to respectively the heel and the head;
 the clamping device being in one block of monolithic material such as metal.

The clamping device allows clamping a workpiece on which an operation will occur with the help of the tool device on the same installation. Applications of the installation can be for instance inserting a mandrel in a tube, assembling a catheter or gluing two glass fibers.

According to a characteristic, the installation comprises action means for each clamping device for acting the head between the clamping position and the opening position. For example, the action means comprise a jack acting on an upper surface of the head.

According to an improvement, the base comprises a main surface to fix the device on the structure of the installation, the main surface being perpendicular to the action direction, wherein the base comprises a groove opened on the main surface and centered on the clamping space in cooperation with a protruding guide fixed on the structure.

The invention is related also to an installation for assembling two workpieces, each workpiece having a constant section, the installation comprising a structure, an assembling tool device fixed on the structure, a first clamping device for clamping a first of the two workpieces, a second clamping device for clamping the second of the two workpieces near the tool device, each clamping device comprising:
 a base fixed on the structure;
 a head;
 a couple of jaws comprising a lower jaw fixed to the base and an upper jaw facing the lower jaw and fixed to the head;
 guiding means to link the head to the base and allowing the displacement of the head in an action direction between a clamping position wherein the jaws define a clamping space having a constant section between them to tight the workpiece, and an opening position wherein the jaws are opened allowing the lateral insertion of the workpiece between the jaws;
 the guiding means comprising at least two plates parallel one with the other, each plate being linked at a first end to a heel of the base and to the head at a second end opposed to the first end, the first ends and second ends being flexible to allow the plates to pivot in relation to respectively the heel and the head;
 the clamping device being in one block of monolithic material such as metal;
 the assembling tool device being located between the first and the second clamping devices, the installation comprising translation means to translate the second clamping device towards and outwards the first clamping device.

Such an installation is adapted for manufacturing a catheter wherein two workpieces are clamped in alignment and in abutment. The assembling tool device performs a preparation of the ends of workpieces and then, the ends are abutted each against the other by the translation means.

BRIEF DESCRIPTION OF THE DRAWINGS

The invention will be better understood and other particularities and advantages will be showed reading the following description which will refer to attached drawings.

DETAILED DESCRIPTION

Figure 1:
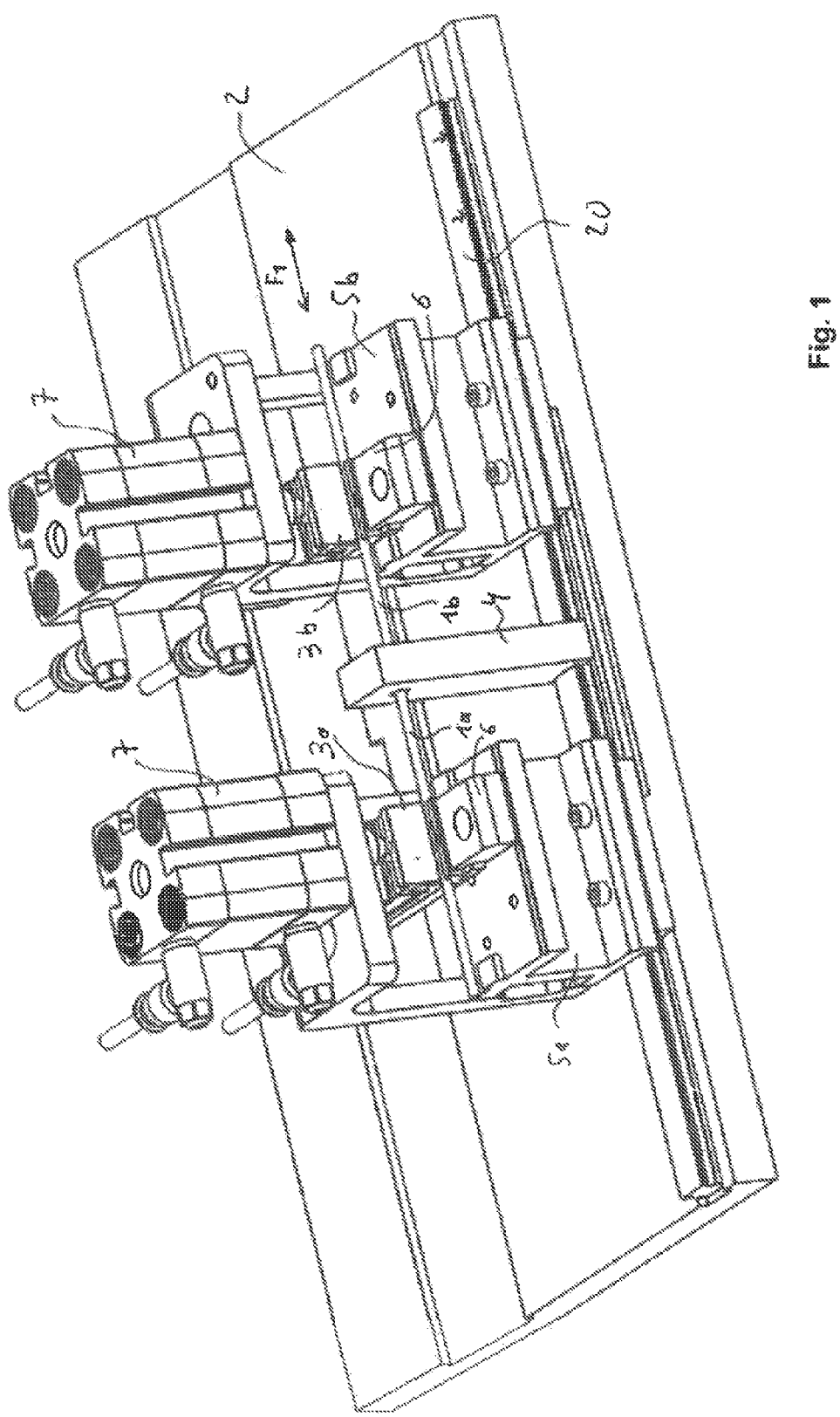
FIG. 1 is a perspective view of an installation according to an embodiment of the invention.
Figure 2:
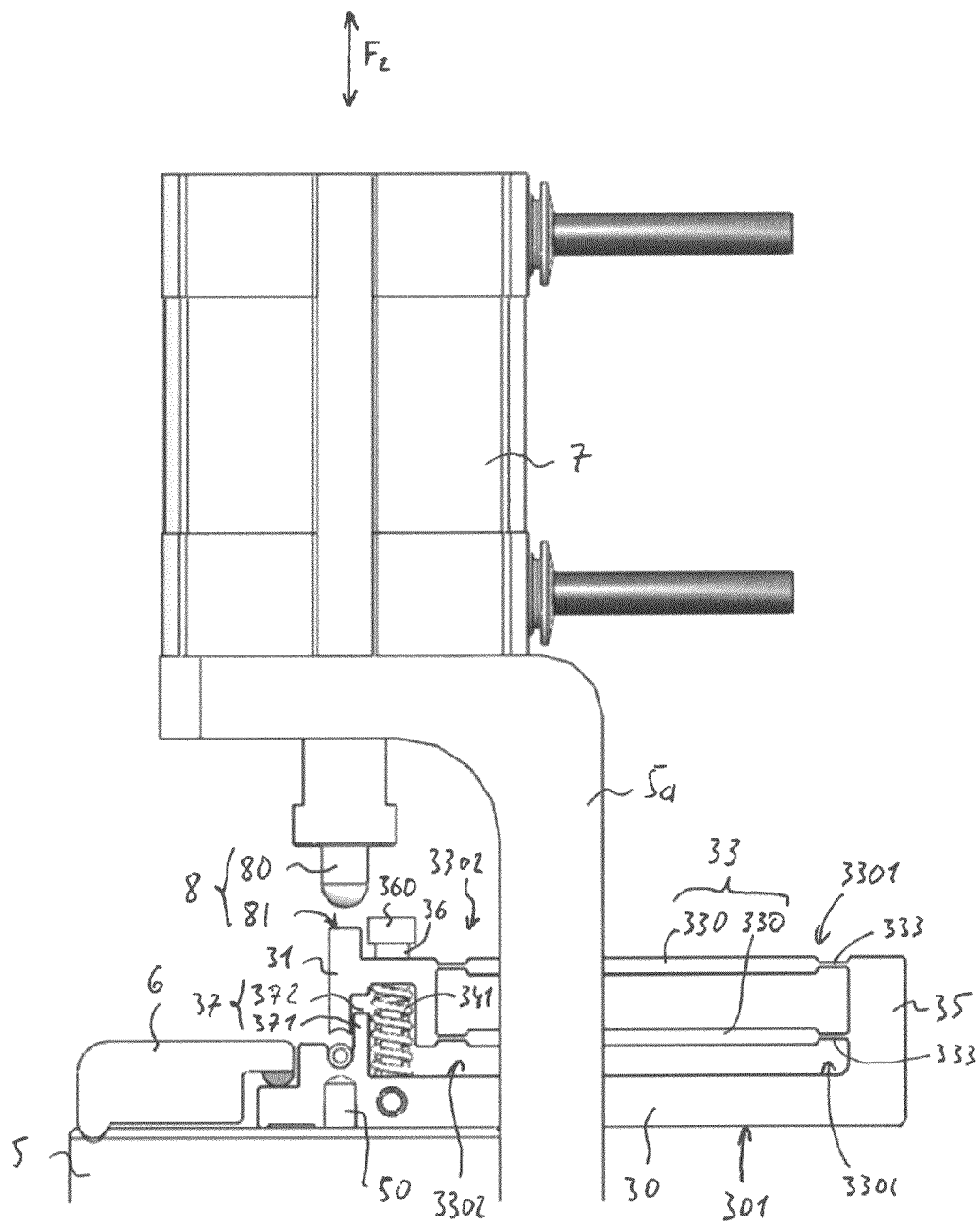
FIG. 2 is a detailed view of the installation of the FIG. 1.

An installation for assembling two workpieces 1a, 1b having a constant section according to the invention is shown on FIGS. 1 and 2. The installation comprises a structure 2 and, in order, a first clamping device 3a for clamping a first of the two workpieces 1a, an assembling tool device 4 fixed on the structure 2 and a second clamping device 3b for clamping the second of the two workpieces 1a, 1b near the tool device 4. The structure 2 comprises an rail 20 along a main direction F1 and on which the assembling tool device 4 is fixed. The first and second clamping devices 3a, 3b, are mounted on the rail 20 with first and second intermediary supports 5a, 5b. The second support 5b is guided in translation and acted by translation means, not shown, to translate the second clamping device 3b on the rail 20 towards and outwards the first clamping device 3a in the main direction F1.

Figure 3:
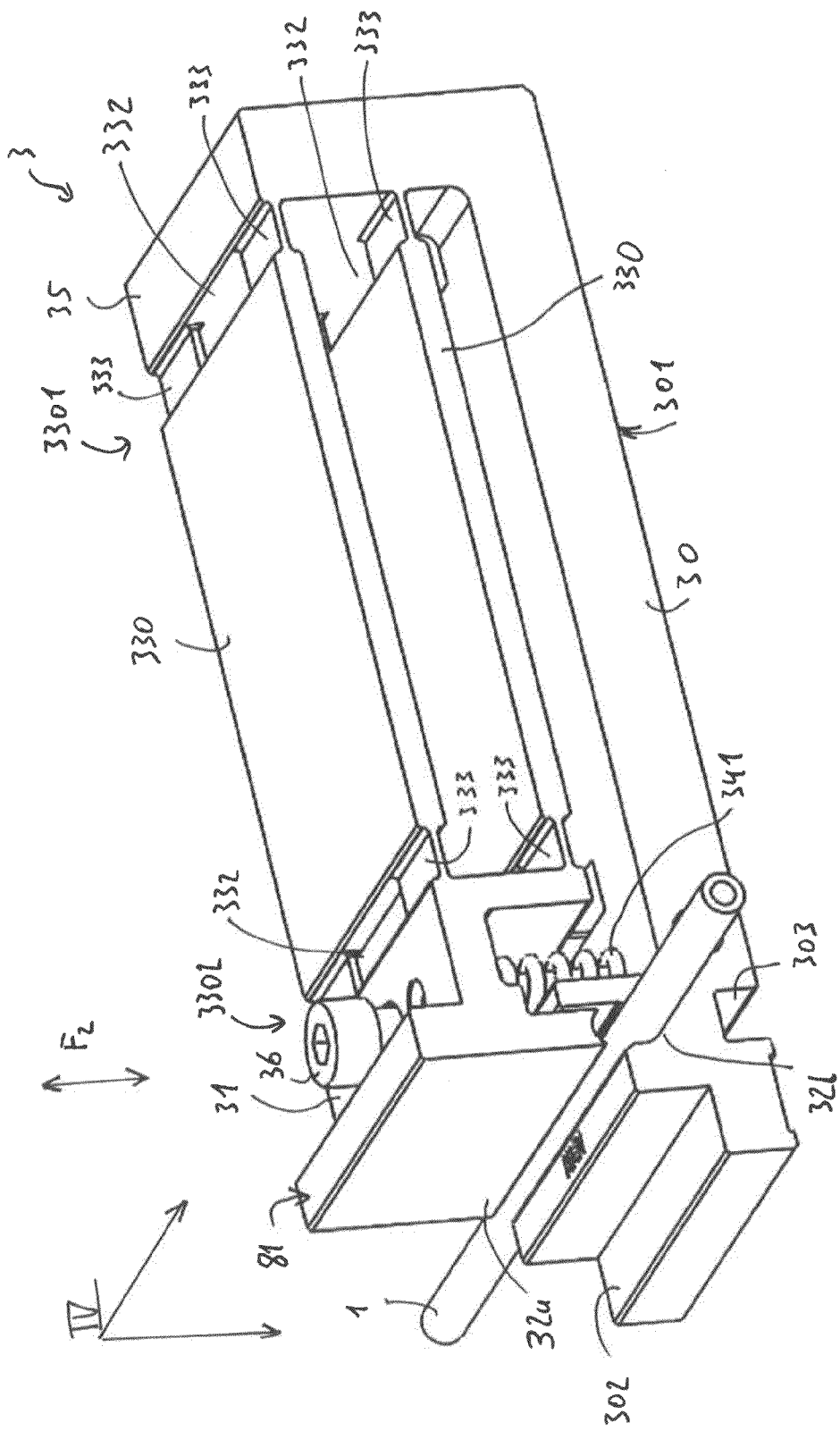
FIG. 3 is a perspective view of a clamping device of the installation of FIG. 1, with a workpiece extending in a main direction.
Figure 4:
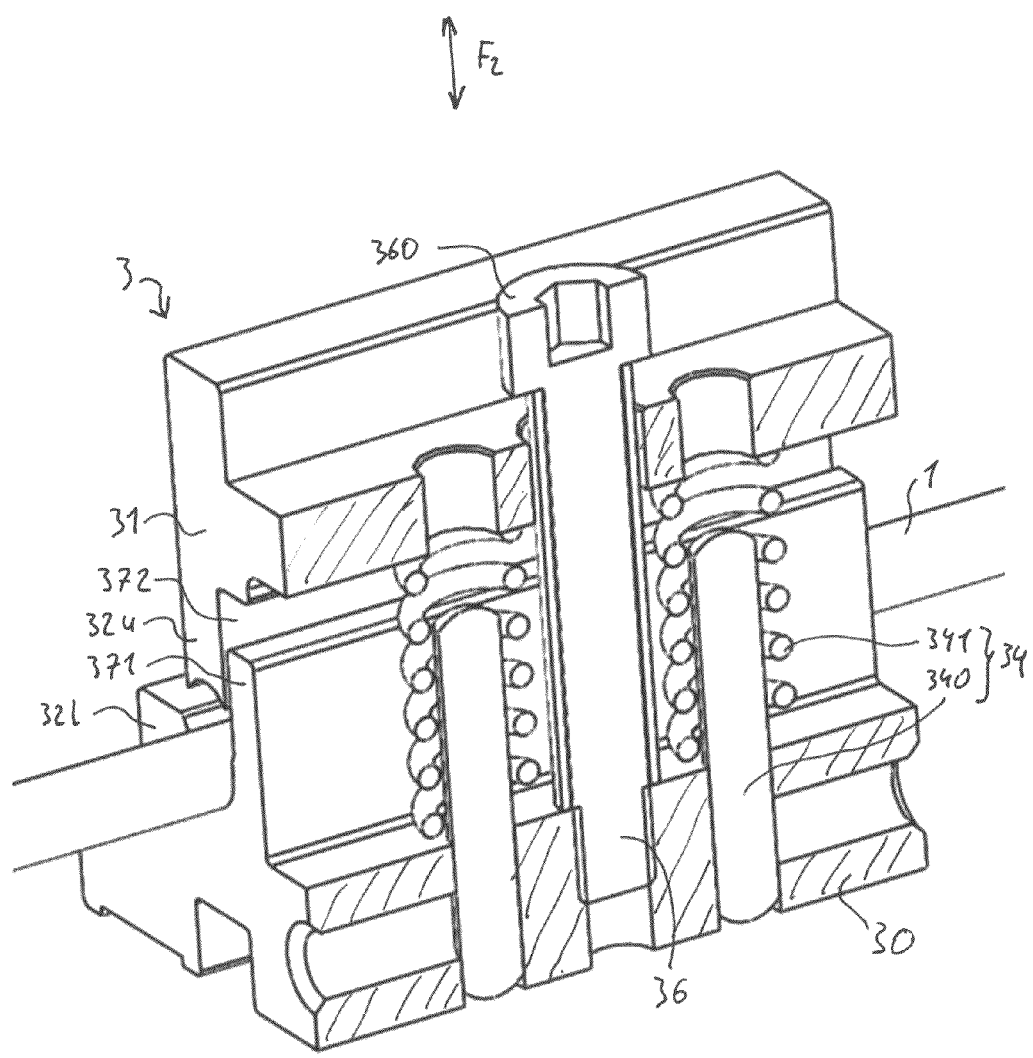
FIG. 4 is a perspective view of the cut clamping device along the plane III-III of FIG. 3.
Figure 5:
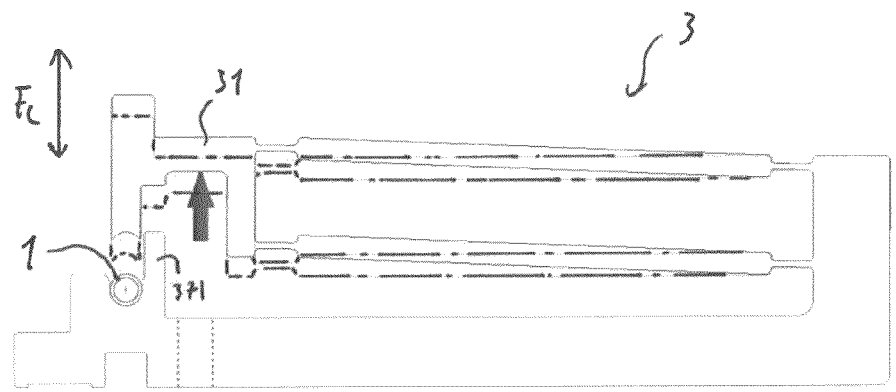
FIG. 5 is a view in the main direction of the clamping device of FIG. 3 in an opening position.
Figure 6:
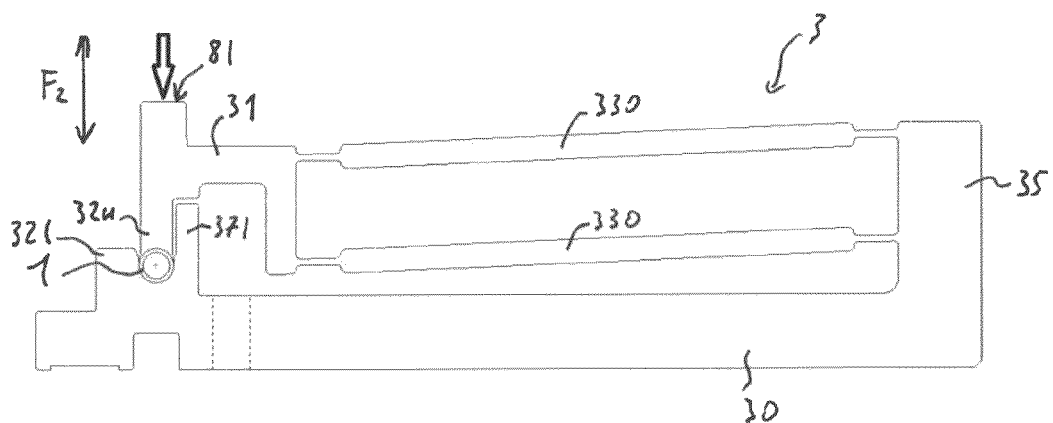
FIG. 6 is a view in the main direction of the clamping device of FIG. 3 in a clamping position.

As shown on FIGS. 2 and 3, each clamping device 3, referenced in a generic manner with the reference 3, comprises:

a base 30 fixed on the structure 2 with the intermediary of one of the supports 5a, 5b;

a head 31;

a couple of jaws 32l, 32u comprising a lower jaw 32l fixed to the base 30 and an upper jaw 32u facing the lower jaw 32l and fixed to the head 31;

guiding means 33 to link the head 31 to the base 30 and allowing the displacement of the head 31 in an action direction F2 between a clamping position wherein the jaws 32l, 32u define a clamping space having a constant section between them to tight the workpiece, referenced in a generic manner with the reference 1, as shown on FIG. 6, and an opening position wherein the jaws 32l, 32u are opened allowing the lateral insertion of the workpiece 1 between the jaws 32l, 32u, as shown on FIG. 5.

The base 30 has a main surface 301 to fix the clamping device 3 on the support 5a, 5b, the main surface 301 being perpendicular to the action direction F2, and comprises a tongue 302 near the jaws, which is clamped on the support 5a, 5b, with a clamp 6. The base 30 comprises a base groove 303 opened on the main surface 301, extending in the main direction F1 and centered on the clamping space, i.e. that the plane defined by the axis of the base groove 303 and the clamping space is perpendicular to the main surface 301. The base groove 303 cooperates with a protruding guide 50 fixed on the support 5a, 5b.

The guiding means 33 comprise at least two plates 330 parallel one with the other, each plate 330 being linked at a first end 3301 to a heel 35 of the base 30 and to the head 31 at a second end 3302 opposed to the first end 3301. The first ends 3301 and second ends 3302 are flexible to allow the plates 330 to pivot in relation to respectively the heel 35 and the head 31. The clamping device 3 is in one block of metal.

Action means like a pneumatic jack 7, are fixed on the respective support 5a, 5b for acting in the action direction F2. The head 31 has linking means 8 to allow the action means 7 to act the head 31 between the clamping position and the opening position. In this case, linking means 8 are the end of a mobile rod 80 of the jack 7 and a flat upper surface 81 of the head 31 on which the mobile rod 80 is acting.

The clamping space defined by the jaws 32l, 32u in clamping position has a circular section to clamp workpieces 1a, 1b being tubular with a circular section.

Each clamping device 3 comprises also balancing means 34 biasing the head 31 towards the opening position. Balancing means 34 comprise two pins 340 tight fitted on the base 30 in the action direction F2 and two springs 341 surrounding the pins 340 and acting between the base 30 and the head 31. The equilibrium position of the guiding means 33 is when the plates are parallel to the base, without the action of balancing means 34, as shown on FIG. 5 with broken lines. In this equilibrium position, the head 31 is in the middle between the opening position and the clamping position.

The clamping device 3 comprises also a stop rod 36 fixed on the base 30 crossing the head 31 through a hole. The stop rod is a screw 36 screwed in the base 30, the head 360 of which being an abutment against which the head 31 is stopped in the opening position. The axis of the screw 36 is in the same plane as the pins 340.

To adjust the flexibility of the first and second ends 3301, 3302 of the plate 330, each end comprises a weakening being less thick than the plate 330 and extending on the whole width of the plate 330, in the main direction F1. Furthermore, the first and second ends 3302 of the plates 330 comprise openings 332 through the whole thickness of the weakening and a part of the width of the plate 330. Thus, the ends of each plate 330 are like pairs of fine blades 333.

The clamping device 3 comprises abutment means 37, the abutment means 37 comprising a shoulder 371 protruding from the lower jaw 32l towards the upper jaw 32u, and an abutment groove 372 in the head 31, the shoulder 371 being abutted in the abutment groove 372 when the head 31 is in the clamping position.

When the installation is used, the first workpiece 1a like a tube is placed between the upper jaw 32u and the lower jaw 32l of the first clamping device 3a when the clamping device 3a is in opening position, as shown on FIG. 5. The workpiece 1a is guided by the shoulder 371 during the placement. The jack 7 is acted to push on the upper surface 81 of the head 31. The plates 330 rotate at their ends by the flexion of the blades 333 and the head 31 displaces in the action direction F2 till the shoulder 371 is in abutment against the abutment groove 372, as shown on FIG. 6. Thus the workpiece 1a is clamped between the jaws 32l, 32u.

A second workpiece 1b is clamped in the same manner by the second clamping device 3b. The two workpieces 1a, 1b are aligned and positioned in abutment at the level of the assembling tool device 4. The assembling operation needs in some cases that the workpieces 1a, 1b are pushed one against the other, which is possible with the translation means.

The invention claimed is:

1. A clamping device for clamping a workpiece having a constant section, comprising:
   a base;
   a head;
   jaws comprising a lower jaw fixed to the base and an upper jaw facing the lower jaw and fixed to the head;
   a guide to link the head to the base and to allow the displacement of the head in an action direction between a clamping position wherein the jaws define a clamping space having a constant section between them to clamp the workpiece, and an opening position wherein the jaws are opened allowing the lateral insertion of the workpiece between the jaws;
   the guide comprising at least two plates parallel one with the other, each plate having a first end linked to a heel of the base and a second end opposite the first end and linked to the head, the first end and second end being flexible to allow the plates to pivot in relation to the heel and the head, respectively;
   the clamping device being in one block of monolithic material.

2. The clamping device according to claim 1, wherein the head has linking means to allow action means to act on the head between the clamping position and the opening position.

3. The clamping device according to claim 1, comprising balancing means to bias the head towards the opening position.

4. The clamping device according to claim 3, wherein the balancing means comprises at least a pin fixed on the base in the action direction and a spring surrounding the pin and acting between the base and the head.

5. The clamping device according to claim 3, comprising a stop rod fixed on the base crossing the head through a hole, the stop rod having a abutment against which the head is stopped in the opening position.

6. The clamping device according to claim 1, wherein the first end or second end of each plate comprises a weakening being less thick than the plate.

7. The clamping device according to claim 1, wherein the first end or second end of each plate comprises an opening through the full thickness of the plate and a part of the width of the plate.

8. The clamping device according to claim 1, wherein the base comprises a main surface to fix the device on an installation, the main surface being perpendicular to the action direction, and wherein the base comprises a base groove opened on the main surface and centered on the clamping space.

9. The clamping device according to claim 1, further comprising an abutment comprising a shoulder protruding from the lower jaw towards the upper jaw, and an abutment groove in the head, the shoulder being abutted in the abutment groove when the head is in the clamping position.

10. The clamping device according to claim 1, wherein the base comprises a tongue at an end opposed to the heel, to clamp the base on an installation.

11. An installation for working on a workpiece having a constant section, the installation comprising a structure, a tool device fixed on the structure, at least one clamping device for clamping the workpiece near the tool device, the clamping device comprising:
- a base fixed on the structure;
- a head;
- jaws comprising a lower jaw fixed to the base and an upper jaw facing the lower jaw and fixed to the head;
- a guide to link the head to the base and to allow displacement of the head in an action direction between a clamping position wherein the jaws define a clamping space having a constant section between them to clamp the workpiece, and an opening position wherein the jaws are opened allowing the lateral insertion of the workpiece between the jaws;
- the guide comprising at least two plates parallel one with the other, each plate having a first end linked to a heel of the base and a second end opposite the first end and linked to the head, the first end and second end being flexible to allow the plates to pivot in relation to the heel and the head, respectively
- the clamping device being in one block of monolithic material.

12. The installation according to claim 11, comprising action means for each clamping device to act on the head between the clamping position and the opening position.

13. The installation according to claim 12, wherein the action means comprises a jack acting on an upper surface of the head.

14. The installation according to claim 11, wherein the base comprises a main surface to fix the device on the structure of the installation, the main surface being perpendicular to the action direction, wherein the base comprises a base groove opened on the main surface and centered on the clamping space in cooperation with a protruding guide fixed on the structure.

15. An installation for assembling two workpieces, each workpiece having a constant section, the installation comprising a structure, an assembling tool device fixed on the structure, a first clamping device for clamping a first of the two workpieces, a second clamping device for clamping the second of the two workpieces near the tool device, each clamping device comprising:
- a base fixed on the structure;
- a head;
- jaws comprising a lower jaw fixed to the base and an upper jaw facing the lower jaw and fixed to the head;
- a guide to link the head to the base and to allow the displacement of the head in an action direction between a clamping position, wherein the jaws define a clamping space having a constant section between them to grasp the workpiece, and an opening position wherein the jaws are opened allowing the lateral insertion of the workpiece between the jaws;
- the guide comprising at least two plates parallel one with the other, each plate having a first end linked to a heel of the base and a second end opposite the first end and linked to the head, the first end and second end being flexible to allow the plates to pivot in relation to the heel and the head, respectively
- the clamping device being in one block of monolithic material;
- the assembling tool device being located between the first and the second clamping devices, the installation comprising translation means to translate the second clamping device towards and outwards the first clamping device.

* * * * *